Oct. 10, 1967   J. E. LINDBERG, JR   3,345,875
HEAT DETECTING SENSOR

Filed Nov. 1, 1965   2 Sheets-Sheet 1

INVENTOR.
JOHN E. LINDBERG, JR.
BY
ATTY.

Oct. 10, 1967 — J. E. LINDBERG, JR — 3,345,875
HEAT DETECTING SENSOR
Filed Nov. 1, 1965 — 2 Sheets-Sheet 2

INVENTOR.
JOHN E. LINDBERG, JR.
ATTY.

United States Patent Office 3,345,875
Patented Oct. 10, 1967

3,345,875
HEAT DETECTING SENSOR
John E. Lindberg, Jr., 1211 Upper Happy Valley Road,
Lafayette, Calif. 94549
Filed Nov. 1, 1965, Ser. No. 518,498
13 Claims. (Cl. 73—368.3)

This application is a continuation-in-part of application Ser. No. 396,468, filed Sept. 8, 1964, which was a continuation-in-part of application Ser. No. 94,571, filed Mar. 9, 1961, now abandoned, which was a continuation-in-part of application Ser. No. 815,406, filed May 25, 1959, now U.S. Patent No. 3,122,728, issued Feb. 25, 1964.

This invention relates to improvements in heat detection.

The invention is characterized by its provision of a novel non-electric heat-detecting element or sensor. Only this detecting sensor need be located in a fire zone (or other heat-detection zone), and it is connected, preferably outside the zone, to an electrical warning or corrective system, preferably by a pressure-sensitive instrument that I term a responder. The responder may most conveniently be located outside the zone in which detection is desired, though usually close to it. The actual alarm or heat-condition indicator can be connected to the responder by a wire of practically any desired length. For example, the non-electric heat-detecting sensor may be inside a house, the responder just outside the house, and the indicator at the fire station.

Furthermore, the novel heat-detecting sensor may be filamentary—a long, very-narrow-diameter, hollow tube. It may extend along a line, around a circle, or along any desired path and for quite a considerable length.

The invention is useful for detecting fire or overheat conditions at any point in any vehicle or building, and has numerous commercial and industrial applications.

False alarms have plagued all heat- and fire-detecting systems relying for detection on electrical circuits extending into the fire zone. For example, moisture condensation has often caused electrical fire-detectors to develop low-resistance shorts that resulted in false alarms.

The present invention solves the problem of preventing moisture and other atmospheric conditions from causing false alarms, and it does this by using a sensor that is never actuated by moisture or by atmospheric conditions, and by using a low-impedance circuit.

This invention also eliminates other factors that led to false alarms or failures in prior-art devices. Such problems as moisture condensation in voids at the joints between successive elements of continuous-type detectors and the accumulation of foreign material in the connections, both leading to low-resistance shunt paths between the inner conductor and the outer shell and hence to false warning, cannot occur in this invention. My invention uses only the simplest electrical connection and normally locates that conection at or behind the fire wall, where it is well protected.

An outstanding feature of the invention is that the warning circuit can be operated at an impedance of less than one ohm. This feature greatly increases the reliability of the system, for this impedance is so low that complete immersion of the circuit in water does not seriously affect its operation.

Some prior-art types of fire detectors have given false alarms because they responded to the *rate of change* of temperature rather than, or in addition to, a predetermined high *temperature level*. The device of this invention can be made independent of the rate of change of temperature or can be made to have any desired degree of dependence on it; so another source of false alarms is obviated.

A further object is to provide a fire detector capable of indefinitely recycling, giving warning each time a critical elevated temperature is reached and withdrawing the warning each time the temperature drops.

Another object is to provide a fire-detection system which avoids the complexities characteristic of the circuits and mechanical elements of other fire detectors. For example, no amplifiers or relays need be used in this system.

Another object is to provide a completely hermetically sealed heat-detection transducer, entirely free from environmental errors caused by such things as pressure and altitude changes, moisture condensation, and so on.

Other objects and advantages of the invention will appear from the following description of several preferred embodiments thereof.

In the drawings:

FIG. 1 is a diagrammatic view in elevation of a fire-detection system embodying the principles of this invention, so installed as to detect fire in a house and give an alarm in a fire station, when and if fire does occur in the house. The broken line in the conductor indicates that the distance between the house and the fire station is not shown and can be any such distance as is commonly encountered.

FIG. 2 is an enlarged view in elevation and in section of a simplified form of fire-detection system, as may be used in FIG. 1. It shows the responder and a heat-detection sensor that is broken in the middle to conserve space. The electrical circuit is shown diagrammatically.

A. GENERAL STATEMENT OF THE INVENTION

Figure 1:
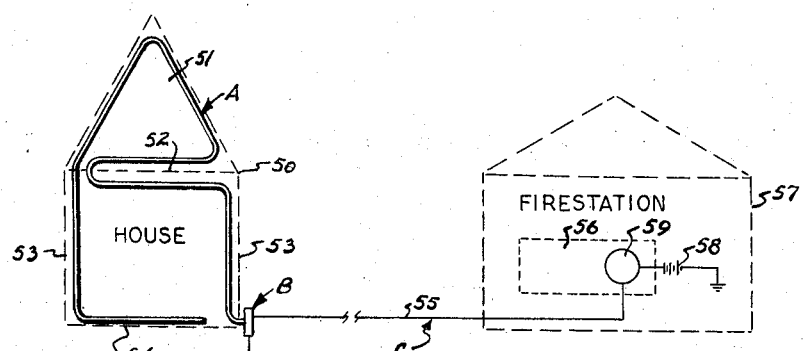

As shown in FIG. 1, the fire detection system of this invention comprises (1) a non-electric detection means, preferably in the form of a generally filamentary sensor A of indeterminate length, (2) a responder B, and (3) an electrical circuit C. The function of the sensor A is to actuate the responder B, and the function of the responder B is to actuate the electrical circuit C in response to predetermined conditions of temperature obtaining in the environment within which the sensor A is located. Thus, the sensor A and the responder B, considered together, comprise a transducer.

The sensor A may be further defined in general terms (see FIGS. 3–6) as a generally filamentary enclosure D of extended length connected to the responder B and containing means E responsive to heat in the environment of the sensor A, for lowering the pressure in the responder B.

The responder B may be thought of as typically a pressure-actuated electrical switch that opens or closes the electrical circuit C in response to pressure changes induced by the sensor A as a result of the effect of temperature on the sensor A.

The electrical circuit C may be a warning circuit or a remedial circuit. Several responders B may be used in one circuit, if desired, to control it in some manner that depends on the temperature conditions of the environments to which the sensors A are exposed.

B. GENERAL ILLUSTRATION OF THE INVENTION: A HOME INSTALLATION (FIG. 1)

The fire detector system of this invention may be used to give instant alarm in a fire station when there is a fire in a home. For example, as shown in FIG. 1, the detector element or sensor A may be disposed along critical locations in John Doe's house 50; such as in an attic 51, immediately beneath and above a ceiling 52, down one or more walls 53, and along one or more floors 54. As will be shown presently, the sensor A may comprise a thin, generally filamentary tube and may be quite inconspicuous when installed.

The responder B may be located just outside the house 50 and is an actuator that closes an electrical circuit C, none of which extends inside the house 50. The circuit C includes a conductor 55, such as copper wire that leads to an alarm panel 56 in a fire station 57. The circuit C may have its power supply 58 located in the fire station 57. The panel 56 may include a bell or buzzer or other audible warning (not shown) as well as a signal light 59 identifying the house 50 as John Doe's house. There may be as many lights 59 on the panel 56 as there are homes having the warning system installed; so each house can be instantly identified.

When a fire occurs in John Doe's house 50, the sensor A is heated. In a manner explained later, the rise in temperature lowers the pressure inside the sensor A, and this reduction in pressure acts on the responder B almost instantaneously, closing the circuit C (in a manner also explained later). Upon closure of the circuit C, current flows through the conductor 55 and lights the light 59, also giving audible warning if desired. The men in the fire station can take immediate remedial action to save John Doe's house.

C. DETAILED DESCRIPTION OF SOME PREFERRED FORMS OF THE SYSTEM AND ITS COMPONENTS

1. The Sensor A

The fire detector of this invention includes a novel detecting means or sensor A. The sensor A has a gas-tight enclosure D, preferably comprising a narrow-diameter metal tube of constant cross-sectional area and of any desired length. Within this enclosure D is means E responsive to the temperature of the enclosure D for varying the pressure inside the enclosure D. This means E may also be referred to as a transducing agent. The only opening in the enclosure D is connected to the responder B, which itself defines a closed chamber connected to the enclosure D. An alteration of the internal pressure within the enclosure D therefore affects the responder B.

(a) *The transducing agent E.*—This invention depends, in most aspects, upon the ability of certain classes of substances, herein called transducing agents E, to take up substantial volumes of gas when elevated to a temperature sought to be detected. When these materials are enclosed in a constant-volume container D and subjected to temperature changes, the resultant alteration of the internal pressure of the container D is employed to actuate the responder B to close or open a warning system C. Hydrogen interacts with what are known as the "Group A metals," consisting of copper, iron, cobalt, nickel, aluminum, platinum, manganese, rhenium, osmium, iridium, ruthenium, rhodium, chromium (at temperatures greater than about 300° C.) and alloys of these metals with each other. The action appears to be a type of solubility, and the solubility increases with increasing temperature. Examples of the sorptive capacities of typical class A materials are illustrated in Table I.

TABLE I.—SORPTION OF HYDROGEN BY TYPICAL METALS OF GROUP A
[In cm.³ (S.T.P.) per 100 gms. at 1 atm.]

| Temperature ° C. | Nickel | Copper | Chromium |
|---|---|---|---|
| 200 | 1.70 | | |
| 400 | 3.15 | 0.06 | |
| 600 | 5.25 | 0.30 | 0.5 |
| 1,000 | 9.80 | 1.58 | 3.0 |

The following table shows how much hydrogen at standard temperature and pressure is contained in some typical Group A hydrides at 1000° C.

TABLE II

Hydrogen content at 1000° C. (converted to S.T.P. conditions)

| Metal: | in cc. hydrogen/cc. metal |
|---|---|
| Aluminum | 0.108 |
| Copper | 0.141 |
| Chromium | 0.21 |
| Iron | 0.43 |
| Cobalt | 0.29 |
| Nickel | 0.87 |

Oxygen also reacts similarly with some metals, but in many cases it is difficult to distinguish between solution of oxygen and solution of oxides. However, the formation of true solutions has been determined in silver, copper, cobalt, and a few other metals. Examples of the solubility of oxygen in silver and copper are listed in Tables III and IV.

TABLE III.—SOLUBILITY OF OXYGEN IN SILVER AT 1 ATM. PRESSURE

| T. ° C.: | cm.³/100 g. |
|---|---|
| 400 | 0.83 |
| 600 | 1.26 |
| 800 | 3.37 |

TABLE IV.—SOLUBILITY OF OXYGEN IN COPPER AT 1 ATM. PRESSURE

| T. ° C.: | cm.³/100 g. |
|---|---|
| 600 | 5.0 |
| 800 | 6.6 |
| 1050 | 11.0 |

With the materials of this invention the process of sorption and desorption is reversible. Thus a sample of such material may be subjected to the sorption and desorption process for an indefinite number of repetitive cycles. These materials when located within a closed chamber, provide an effective means of altering the internal pressure of the chamber. This internal pressure is a function of the temperature applied to the material. In general, there exists a one-to-one correspondence between this pressure and the temperature. Thus, the enclosed material functions as an element which effectively converts temperature variations into pressure variations and that is why the general class of material is referred to herein as transducing agents.

(b) *Typical sensor structures.*—FIGS. 3–6 illustrate a few of the many ways in which the sensor A may be constructed. Transducing agents E may be used in a filamentary, pellet, or chunk form, always being placed inside the sensor tube D, which may be a non-porous tube of constant cross-sectional area. In all cases there has to be passage means for holding the hydrogen or oxygen and for transmitting the pressure changes along the tube. In applications where the tubes D are to be bent or curved around corners, metal is the preferred material. Suitable metals are pure iron, which is impermeable to many gases, stainless steel, and molybdenum, for example. In applications where bending is not required and minimum diffusion is desired, the tube D is preferably made from non-porous quartz, ceramic, or special glass. In any event, the inner surface of the tube D should not react with the materials it contacts, including the gas involved. A typical sensor tube D is preferably about .030" to 0.060" outside diameter with a wall thickness of preferably about 0.005" to 0.015". Such tubes D are preferably about one to forty feet long, although they may be longer or shorter.

Figure 3:
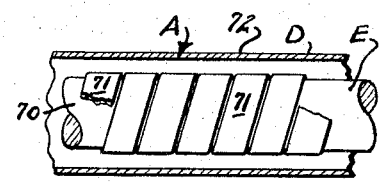
FIG. 3 is a greatly enlarged view in elevation and in section of a portion of one preferred form of a heat-detection sensor of this invention.

FIG. 3 shows a preferred form of transducing agent E enclosed in the sensor tube D along with a desired gas—either hydrogen or oxygen. Here the transducing agent E is a filament 70, such as copper wire, and may be about 0.005" to 0.020" in diameter, for example. A ribbon 71 of suitable material, such as molybdenum or tungsten preferably about 0.020" wide and 0.002" thick, is wrapped tightly around the filamentary transducing agent 70 and fits within the tube D. The ribbon 71 physically spaces the filament 70 from the walls 72 of the tube D and prevents the transducing agent 70 from fusing or welding to the tube walls 72, even in the event that the sensor A is exposed to extreme heat. Also, if no porous, non-reactive enclosing structure is provided, as with molybdenum or tungsten ribbon wrap 71, the hydride tends to coalesce at high temperature into a solid body preventing proper passage of gas. This coalescing is apparently partly due to crystallization and growth, and when the filament 70 takes up hydrogen, it greatly increases its size and therefore tends to put a high-pressure sealed plug within the tube D, preventing gas passage. The spiral space between successive turns of the ribbon 71 may provide the passage means for the gas when the wire 70 is fully ingassed so that the ribbon 71 is forced substantially into contact with the tube walls 72, but even when tightly wrapped, the ribbon 71 does not prevent movement of hydrogen or oxygen.

As a simplified example of installation of the sensor A of FIG. 3 of the responder B, one end 73 (FIG. 2) of the tube D may be connected by a gas-tight seal to the responder B, while the other end 74 of the tube D is still open. This free end 74 may be connected to a vacuum pump and the tube D pumped free of gas. Then the tube D is heated, and then pure hydrogen (or oxygen, but not both) is forced in through the free end 74, the copper filament 70 absorbing the hydrogen (or oxygen) while it heats. The originally pure metal 70 is thus converted into an ingassed hydride (or oxide), expanding about 15% as it does so. The free end 74 is then sealed off, and the device is ready for operation. It can cool and thereby degas, creating pressure in the tube D which will be lowered when the sensor A is heated. A similar process may be followed with oxygen to produce the oxide.

Figure 4:
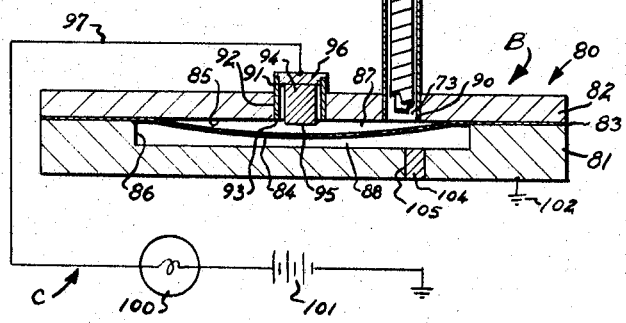
FIG. 4 is a view similar to FIG. 3, of a modified form of sensor, also embodying the principles of the invention.
Figure 4:
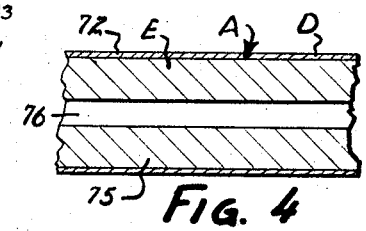

In the sensor A of FIG. 4, the transducing agent E may consist of powdered hydride (or oxide) or the metal therefor molded or pressed into the form of a tube 75 or of a metal of the group described made in the form of the tube 75 and then ingassed. The hole 76 which extends axially along the length of the tube 75 serves as the free volume space through which evolved gas may flow. The tube 75 is fitted into the tube D, the tube end 73 (FIG. 2) connected to the responder B, the tube D processed as described above or as desired, and the end 74 sealed.

Figure 5:
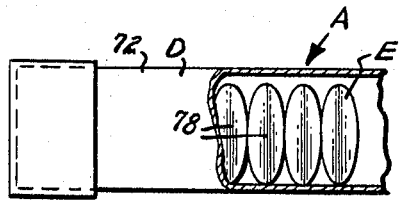
FIG. 5 is a view similar to FIG. 3, of another modified form of sensor.

The transducing agent E may be used in the form of a series of discrete pellets 78 as shown in FIG. 5. The pellets 78 may be formed by molding or pressing powdered hydride (or oxide) or the metal therefor, for example, possibly using a binder, compressing the mixture into pellet form. The pellets 78 are made slightly smaller than the inside diameter of the tube wall 72 to allow passage of gas evolved from the pellets 78.

Figure 6:
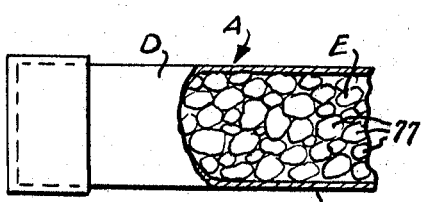
FIG. 6 is a view similar to FIG. 3, of still another modified form of sensor.

In FIG. 6 the transducing agent E comprises a series of small granules 77 within the tube D. These granules may be number 40 or 70 grit size of nickel hydride or chromium hydride (or part nickel or chromium) for example, or cobalt oxide (or cobalt) may be used. Care must be taken in this form of the invention that the intergranule space provides sufficient passage means for the liberated gas and to contain the gas that is to be taken up on heating.

Although only a few specific forms for the agent E have been illustrated or described, others are possible, and it is intended that their omission not be in any sense limiting or restrictive to the possible application and construction of this invention.

Figure 2:
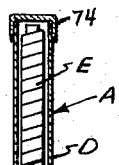

Thus, the combination of the tube D and the transducer agent E functions as the heat-sensitive element or sensor A in this fire detector. In FIG. 2, the sensor A may contain a hydride, such as cooper or chromium hydride or may contain copper or silver oxide. At ordinary temperatures these compounds will not absorb their gas until heated to or above a certain threshold temperature. At such a threshold temperature, ingassing of the compound will begin to occur, during which some of the hydrogen will be taken up as a solution in the metal, thereby decreasing the pressure inside the tube D. As stated earlier, one end 74 of the sensor A is sealed while a pressure-sensitive switch or responder B is sealed to the tube D at the other end. Let us now consider the responder B.

2. *A single form of responder B (FIG. 2)*

Any pressure switch that is properly sensitive and has the needed connections may be used as a responder B. However, I have invented a new pressure switch that is especially suitable for use herein. This switch is fully disclosed and claimed in a copending patent application, Ser. No. 86,252, filed Jan. 26, 1961.

FIG. 2 shows a simple form of responder B, suitable for simple installations such as are shown in FIG. 1. This responder B comprises a unit 80 and has two circular plates 81 and 82, preferably of non-porous metal, between which is bonded (as by brazing) a thin metal flexible disc or diaphragm 83. The plates 81 and 82 are hermetically sealed together and are in electrical contact for their full peripheries and over a substantial margin, but in the center the diaphragm 83 has a generally spherical depression 84 called a "blister," which is free to move relative to the plates 81 and 82 and constitutes the active or movable part of the diaphragm 83. Use of a diaphragm with a blister 84 makes possible the use of an upper plate 82 with a planar lower surface 85 and gives a more predictable response, but other diaphragm structures may be used where feasible. The lower plate 81 is formed with a recess 86 in its upper surfaces and the diaphragm 83 divides the resultant cavity between the plates into two regions or chambers 87 and 88. The region 87 communicates with the sensor A, so it may be called the "sensor chamber." The other region 88 is located on the opposite side of the diaphragm 83 from the sensor A; so it may be called the "anti-sensor chamber." Of course, either plate 81 or 82 may actually be made by brazing together several thin plates of the desired configuration, and the recess 86 may be provided by using a stack of preformed thin washers over a disc. A preferred material for all the metal elements in the responder 80 is molybdenum. The end 73 of the sensor tube D is joined to and sealed to the upper plate 82, fitting within a hole 90. The region 87 is closed and sealed except for its communication with the lumen of the sensor tube D.

A tube 91 of non-porous ceramic material or other non-porous electrically-insulating material extends through an opening 92 in the upper plate 82 and is hermetically sealed in place there with its lower end 93 flush with the bottom surface 85 of the plate 82. The hole 92 and tube 91 are preferably centered with respect to the blister 84, on the sensor side thereof. A metal electrode 94 is located inside and joined securely to the tube 91, with a portion 95 of the electrode 94 extending below the lower surface 85 of the plate 82. The amount by which the portion 95 extends below the surface 85 is carefully controlled so as to be uniform in each responder of any particular design. This geometry means that the blister 84 can make electrical contact with the electrode portion 95 when the blister 84 is forced up by the pressure in the anti-sensor chamber 88 exceeding the pressure in the sensor chamber 87. The electrode 94 may have a portion 96 serving as a cap for hermetically sealing the tube 91. A conducting wire 97 extends from the electrode 94, preferably from the cap 96.

If sufficient pressure is applied to the sensor side of the blister 84, it and the natural shape of the blister 84 will hold the blister 84 away from the electrode portion 95; and if the pressure in the chamber 87 is decreased, the pressure in the anti-sensor chamber 88 will force the blister 84 to make contact with the electrode portion 95. The forces necessary to do this may be chosen by proper design of the blister to accommodate a wide range of values.

3. *A simple circuit C and its operation (FIG. 2)*

As explained before, the responder B may be connected to an alarm circuit which, as shown in FIG. 2, may be a simple visual indicator consisting of a lamp 100 in series with the conducting wire 97 and a source 101 of electrical current, which may be a battery, as shown, or may be a source of alternating current. A return path for the electrical circuit C may be provided by grounding either one of the plates 81 or 82 and is shown as a ground wire 102 in FIG. 2.

In operation, at normal temperatures the pressure in the sensor chamber 87 and the natural shape of the blister 84 will hold the circuit open, as shown in FIG. 2, but when the sensor A is exposed to heat at a level high enough to cause the transducing agent E to rise above its threshold temperature, hydrogen is taken in by the agent E and consequently the pressure upon the blister 84 from the sensor chamber 87 is reduced. This reduction in pressure will drop so low that the pressure in the anti-sensor chamber 88 tends to move the blister 84 away from the plate 81 and toward the plate 82. The pressure in the sensor chamber 87 is a function of the temperature of the sensor A, and in general there will be a one-to-one correspondence between the temperature of the sensor A and the pressure within the sensor chamber 87. This pressure, if low enough, will cause the blister 84 to make contact with the electrode 94, but no contact will be made unless the temperature of the sensor A is at or above a definite level.

When the sensor A is exposed to heat at a level high enough to cause the blister 84 to make contact with the electrode 94, current flows from the battery 101 through the lamp 100, the conductor 97, the electrode 94, and the blister 84 to the plates 81 and 82 and returns to the battery 101 through ground line 102. This current flow causes the lamp 100 to light and provides a visual indication that the temperature of the sensor A is at or above a certain level. In this sense, the device shown in FIG. 2 functions as a threshold temperature indicator. When heat is removed from the sensor A, the transducing agent E cools and liberates its previously absorbed gas, resulting in increase of the pressure exerted upon the blister 84. The blister 84 then moves away from the electrode 94, breaking the electrical circuit, and the lamp 100 goes out.

In practice, the sensor A is placed in the area (see FIG. 1) whose temperature is to be monitored, while the responder B may be located upon or behind a shielded wall or at some easily accessible area. Thus only the sensor A itself need be exposed to possible heat sources, and it contains no element of the electrical warning circuit. In this manner, protection for the respondent B and its associated alarm circuit C may be provided.

4. *Some ways of setting the threshold temperature (FIG. 2)*

The force necessary to deflect the blister 84 against the electrode 94 can be chosen to accommodate a wide range of values by a suitable choice of mechanical parameters. Once this force is determined, the dimensions of the sensor tube D and the amount of transducing agent E may be chosen by design to provide the force necessary to obtain contact between the blister 84 and electrode 94 at a certain temperature.

In addition to mechanical design considerations, the necessary deflecting force may also be altered by precharging the anti-sensor chamber 88 with a gas under pressure or by partially evacuating it. To accomplish this, gas is forced into (or withdrawn from) the chamber 88 through an opening 104 in the plate 81 and then the opening 104 is closed by a plug 105. The required reduction in pressure in the chamber 87 becomes greater as the pressure in the chamber 88 is lowered.

Alternatively, the deflecting conditions may be changed by precharging the inside of the sensor tube D and the sensor chamber 87 with gas. In this case, if the ambient pressure in the sensor chamber 87 is greater than normal, more than normal gaseous absorption by the transducing agent E is required to deflect the blister 84 against the electrode 94. Most gases may be employed for this purpose; however, ideally the gas should not react chemically with its surrounding materials. Particularly suitable are the inert gases, such as helium, argon, neon, and xenon, especially since they do not readily diffuse through most materials. As a consequence, a precharged pressure of argon, for example, may be maintained for an indefinite length of time to retain a desired biasing of the diaphragm 83, as described.

Figure 7:
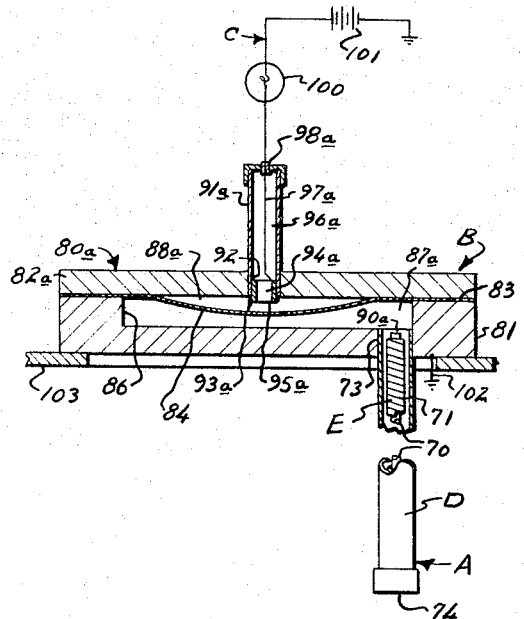
FIG. 7 is a view similar to FIG. 2, showing a somewhat different responder structure in conjunction with a sensor like that of FIG. 3 and a different type of connection to a different electrical circuit.

FIG. 7 shows a similar responder 80a, much like the responder 80, except that there is only one opening in upper plate 82a. The sensor A is connected to an opening 90a in the lower plate 81, on the opposite side of the diaphragm 83 from the electrode 94a, so that the sensor chamber 87a is also on the opposite side of the diaphragm 83 from the electrode 94a and from the anti-sensor chamber 88a. In this form of the invention, heating the sensor A and consequently reducing the pressure in the anti-sensor chamber 87a *opens* the circuit C, while cooling the sensor A closes the circuit. This device may be used as a cooling indicator or as an indicator of heat. The lamp 100 may be replaced by a relay if desired, or any other control device.

Figure 8:
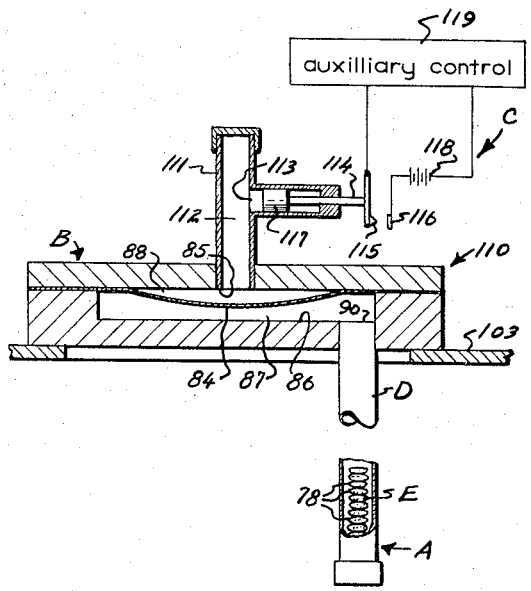
FIG. 8 is a view similar to FIG. 2 of another modified form of responder in conjunction with a sensor like that of FIG. 5.

5. *A modified form of a simple responder B and its modified circuit C (FIG. 8)*

The responder B may also be so used that the variations in pressure occurring on the anti-sensor side of the diaphragm 83 will act indirectly on an auxiliary pressure switch. In this case, the blister 84 does not close against an electrode. In the unit 110 shown in FIG. 8 there is no electrode, but a ceramic tube 111 is inserted in the responder 110, as before, with its interior 112 in direct communication with the anti-sensor chamber 88 and, also, via an arm 113 of the tube 111 with a conventional type of pressure switch 114. This switch 114 may be, for example, one whose contacts 115 and 116 close when pressure is applied to a piston 117.

Thus, when the sensor A is cooled, the diaphragm blister 84 is deflected toward the ceramic tube 111 and causes an increase of pressure in the anti-sensor chamber 88 and the tube interior 112, which in turn is communicated to the pressure switch 114. At the selected pressure, the contacts 115 and 116 of the pressure switch 114 close, and current flows from a battery 118 through an auxiliary control 119. This control 119 may be a lamp like the lamp 100, or it may be a device to perform any other suitable function, such as, for example, to operate a fire extinguisher. (Of course, the lamp 100 in FIG. 2 may also be replaced by such a control 119.) When the temperature of the sensor A rises above a certain value, the blister 84 re-deflects toward the sensor A to its normal position and decreases the pressure within the ceramic tube 111, thereby deactivating and opening the pressure switch 114. The auxiliary control 119 then ceases to function.

Alternatively, the pressure switch 114 may be such that its contacts 115 and 116 are normally closed. Then when the pressure in the interior 112 of the ceramic tube 111 is increased beyond a certain value, the applied pressure to the switch 114 opens its contacts 115 and 116.

This device may be used to perform various suitable functions. For example, it may function as a thermostat, using, say, copper hydride.

6. *A more complex form of responder B and its associated circuit C (FIG. 9)*

Figure 9:
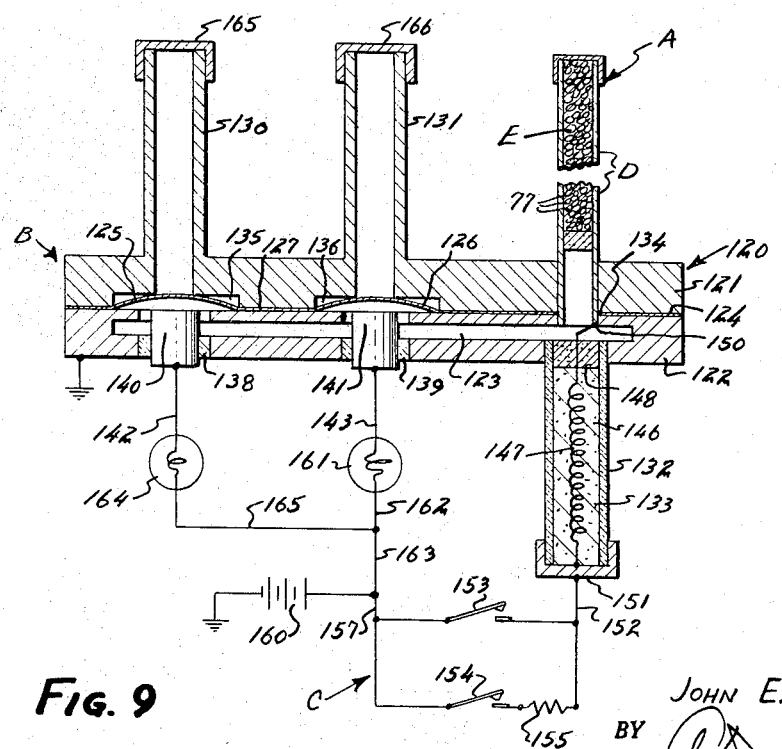
FIG. 9 is another view similar to FIG. 2 of another modified form of responder and a modified electrical circuit, in a heat-detection system employing a single sensor (like that of FIG. 6) to indicate both fire conditions and overheat conditions at a level below the fire level. The system also includes a test mechanism.

(a) *Description of the responder 120 and its circuit.*—When it is desirable to provide an indication of two or more heat levels within the same area, the arrangement shown in FIG. 9 is highly desirable. In addition, FIG. 9 shows a test device that enables the operator to determine whether the unit is functioning properly.

In FIG. 9 the sensor A is joined to a responder 120 at the upper of its two circular metal plates 121 and 122. The upper plate 121 is recessed to provide a cavity for a sensor chamber 123, and a thin, flexible metal diaphragm 124 is sandwiched between the plates 121 and 122 and brazed to them in an hermetic seal. The metal elements 121, 122, and 124 may be molybdenum, Kovar, or Phosphor bronze, for example. The diaphragm 124 is provided with two spherical depressions or blisters 125 and 126, isolated from each other by a portion 127 brazed or otherwise hermetically bonded to the plate 122.

Three ceramic or other non-porous and electrically non-conducting tubes 130, 131, and 132 are provided, two of them sealed into and extending through openings in the upper plate 121 and the third similarly attached to the lower plate 122. The interior 133 of the tube 132 extends directly into the sensor chamber 123, as does the interior of the sensor A from which the gas passes into the sensor chamber 123 through a hole 124 in the diaphragm 124, while the tubes 130 and 131 are centered directly above their respective blisters 125 and 126 and open into separate anti-sensor chambers 135 and 136. Electrodes 140 and 141 are positioned directly opposite the tubes 130 and 131, in the lower plate, and are also centered relatively to the blisters 125 and 126, which are normally urged away from the electrodes 140 and 141 and toward the tubes. The blisters 125 and 126 can each be deflected into contact with their respective electrodes 140 and 141. Conducting wires 142 and 143 from the electrodes 140 and 141 lead to the circuit C.

The interior 133 of the tube 132 is filled with a powdered material 146 such as nickel hydride, and a generally axially extending filament 147 is embedded in this material and extends out of the upper end of the tube 132 through a small plug 148 and terminates on the lower plate 122 at a ground point 150. The plug 148 serves to retain the powdered material 146 within the tube 132 but allows any gas that may be taken in by or released from the material 146 to pass to or from the tube 132 from or into the sensor chamber 123. The lower end of the filament 147 is connected to a sealing cap 151 for the tube 132, and the cap 151 is joined to a conducting wire 152.

The diaphragm 124 and its blisters 125 and 126, together with the bond 127 between them and the bond around the blisters, effectively provides three chambers: the interior 133 of the tube 132 and the interior of the sensor tube D enjoy a common atmosphere with the sensor chamber 123 to the exclusion of any other atmosphere. On the other side of the diaphragm 124 are the two mutually exclusive anti-sensor chambers 135 and 136.

Just as in the device of FIG. 7, the force necessary to deflect the blisters 125 and 126 into contact with the electrodes 140 and 141, respectively, is a function of the mechanical design of the blisters, and may be chosen so that each blister 125 and 126 requires the same or a different deflecting force. In addition, this force may be changed to any desired value by precharging any of the chambers 123, 135, and 136 with an inert gas. For example, the tube 130 may be filled with argon when the sensor is at 800° F. at just enough pressure to cause actuation of the blister 125 to open away from the electrode 140 at that temperature. Then the tube 130 may be sealed; then the temperature of the sensor A may be dropped to, say, 400° F. and the tube 131 charged with argon at a pressure to cause actuation of the blister 126 away from the electrode 141 at that temperature; then the tube 131 may be closed.

The conducting wires 142, 143, and 152 are part of an alarm circuit C. The conductor 152 passes to two normally open parallel test switches 153 and 154, a resistor 155 being in series with the test switch 154. From the switches 153 and 154 a line 157 leads to a main line 158, which leads to a suitable AC or DC current source, such as a battery 160. The conductor 143 is connected to a signal lamp 161, which is connected by lines 162 and 163 to the main line 158. The conductor 142 is connected to a signal lamp 164, which is connected by lines 165 and 163 to the main line 158.

Thus, the responder 120 comprises the two plates 121 and 122 between which is sandwiched the diaphragm 124 with two blisters 125 and 126. In the upper plate 121 are the sensor A and the two tubes 130 and 131, one tube directly above each blister 125 and 126. The tubes 130 and 131 can be pressurized and define the two anti-sensor chambers 135 and 136. In the lower plate 122 are sealed the two contacts 140 and 141, one lying directly below each blister 125 and 126 and an insulating tube 130 and 131. The contacts 140 and 141 are electricallly insulated from each other and from the plate 122 by rings 138 and 139. Within the insulating tube 132 is a powdered Class A transducing agent 146, held in place by the porous plug 148, and in which is imbedded the heater filament 147.

(b) *Operation of the device of FIG. 9.*—When the sensor temperature is low, the pressure in the sensor chamber 123, together with the natural curvature of the blisters 125 and 126, acts to keep the blisters 125 and 126 from touching their respective contacts 140 and 141. When the sensor temperature is raised, the transducing agent E ingases, and the pressure in the sensor chamber 123 is therefore reduced. If the pressure in either of the anti-sensor chambers 135 and 136 is set high enough, then the corresponding blister 125 or 126 will be forced against its contact and the corresponding warning lamp 161 or 164 will light.

With the pressure in the sensor chamber 123 set at a suitable value for conditions obtaining when the sensor A is at room temperature, the sensor A may be heated to a predetermined temperature at which the first alarm is desired, and the pressure in one of the anti-sensor chambers 131 may then be set so that its blister 126 just makes contact with its corresponding terminal 141. The sensor temperature is then raised to the point at which the second alarm is desired, and the pressure in the other anti-sensor chamber 135 is set so that its blister 125 just makes contact with its corresponding terminal 135. The anti-sensor pressures thus obtained are maintained by sealing the anti-sensor chambers 135 and 136 with the caps 165 and 166, or in any other suitable manner.

Examples of possible values for the first and second warning temperatures might be 400° F. and 800° F., respectively. In operation, both blisters 125 and 126 normally curve away from their respective contacts 140 and 141, and neither warning lamp 161 or 164 is lighted. If the sensor temperature reaches 400° F., the transducing agent E begins to ingas, and the pressure in the sensor chamber 123 drops to the point where the pressure in the first anti-sensor chamber 136 forces the corresponding diaphragm 126 against its contact 141, lighting the first warning lamp 161 and indicating an overheat condition. If the sensor temperature reaches 800° F., the transducing agent ingases further and lowers the pressure still more in the sensor chamber 123, this time to the point where the pressure in the second anti-sensor chamber 135 forces the corresponding diaphragm 125 against its contact 140, lighting the second warning lamp 164 and indicating a fire condition.

When the high-temperature condition is remedied, the transducing agent in the sensor A outgases, increasing the pressure in the sensor chamber 123, forcing the blisters 125 and 126 away from their respective contacts 140 and 141, and causing the warning lamps 161 and 164 to go out.

(c) *The test circuit of FIG. 9.*—To test the integrity of the unit, the first test switch 154 is closed causing a current to flow through the resistor 155 and through the filament 147 which is imbedded in the material 146 in the ceramic tube 132. The consequent heating of the filament 147 heats the surrounding material 146 and causes it to ingas, reducing the pressure in the sensor chamber 123 to the point where the first blister 126 is forced against its contact 141. The first warning lamp 161 then lights, indicating that the overheat portion of the detector is functioning properly. The first test switch 154 is then opened and the second test switch 153 is closed, causing the full current to flow directly through the filament 147. Since the resistor 153 is not in the circuit this time, the current through the filament 147 is greater, the material 146 ingases more, and the pressure in the sensor chamber 123 is reduced to the point where both the first and second blisters 125 and 126 are forced against their respective contacts 140 and 141. The consequent lighting of both warning lamps 161 and 164 indicates that the fire portion of the detector is functioning properly.

Notice that if there were a leak in the sensor A, the test material 146 would be unable to reduce the pressure in the sensor chamber 123, and the lamps 161 and 164 would not light during the test. If there were any fault in the electrical circuit the lamps 161 and 164 would not light during the test. Thus the test procedure gives a complete and reliable test of all parts of the detector system.

Although only two blisters 125 and 126 are shown in FIG. 9, more, each with its own alarm circuits, may be placed in a responder B to provide indications of several additional temperature conditions, and their omission is not intended to depart from the spirit and scope of the invention.

From the foregoing, it will be noticed that in each instance the circuit C is a low-impedance circuit. Except where resistors are purposely introduced, the circuit itself may have less than one ohm impedance. This fact greatly increases the reliability of the system.

It will be noticed that a fire detector using the principles of this invention can be made very light in weight. The sensor A is a small tube with very low weight per unit length and the responder B is also quite small and light. The only additional elements in the system are the warning lights and the circuit wiring which can also be made very light weight. A fire detector system consisting of a 24-foot sensor, responder, and indicating lamps (exclusive of the wiring itself) weighs less than eight ounces—a small fraction of the weight of other fire detector systems. This fact gives this invention an obvious advantage in aircraft fire-detector installations wherein weight must always be kept to a minimum.

Materials of this invention liberate gas when the temperature is *lowered*. Suppose, for example, that nickel hydride were used as the transducing agent E. The apparatus of FIG. 7 may be made so that the blister 84 is in its relaxed position when the sensor A is exposed to a temperature of 600° C. Then if the temperature at the sensor A is lowered to, say, 200° C., hydrogen will be released from the nickel hydride and deflect the diaphragm 84 against the electrode 94, energizing the alarm circuit C. In this case, the illumination of the lamp 100 indicates that the temperature in the area to which the sensor A is exposed is at or below 200° C. The reaction is reversible; so when the sensor A is again heated to 600° C., the nickel hydride reabsorbs its previously liberated hydrogen and the diaphragm 84 returns to its relaxed position, de-energizing the alarm circuit C. In this example the device was employed to indicate a temperature drop, but it will be apparent that it can be used to indicate temperature elevation as well by having the warning actuated by a circuit break instead of a circuit make. This technique is well known and need not be described in detail.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A heat sensor comprising an imperforate generally tubular enclosure, solid material of the type that absorbs a certain gas when heated and releases that gas when cooled, disposed substantially uniformly within and along the full length of said tubular enclosure, sensing means providing continuous passage for gas through said enclosure, and a charge of said certain gas in said passage.

2. The combination of claim 1 wherein said solid material is chosen from the group consisting of the oxides of the metals silver, copper, cobalt, the amalgams thereof and the alloys of silver, copper, and cobalt with each other, said certain gas then being oxygen, and the hydrides of copper, iron, cobalt, nickel, aluminum, platinum, manganese, chromium, rhenium, osmium, iridium, ruthenium, and rhodium and alloys between the metals of said hydrides, said certain gas then being hydrogen.

3. The sensor of claim 1 wherein said solid material is in the form of a wire and said enclosure is a tube enclosing said wire.

4. The sensor of claim 3 wherein a ribbon of a metal different from that of said solid material and of the material comprising the tube is spirally wrapped around wire.

5. The sensor of claim 4 wherein said ribbon is chosen from the group consisting of molybdenum and tungsten.

6. The sensor of claim 1 wherein said solid material is in the form of an inner tube fitting snugly in said enclosure, said enclosure also being a tube, said passage means being provided by the lumen of said inner tube.

7. The sensor of claim 1 wherein said solid comprises pieces placed in said enclosure loosely enough to afford said passage means.

8. A heat sensor comprising an imperforate generally tubular enclosure, metallic hydride of the type that releases hydrogen when cooled and takes up hydrogen when heated, disposed continuously in said enclosure along substantially the full length thereof, sensing means providing continuous passage for gas through said enclosure; and hydrogen in said passage.

9. The sensor of claim 8 wherein a plurality of portions of said tube are filled with said hydride and these portions are separated by gaps.

10. The sensor of claim 9 wherein the said hydride used in some said portions is of a different metal from the said hydride used in other said portions.

11. A heat sensor comprising a metal tube with imperforate walls; a wire of metal heavily ingassed with hydrogen, said metal being of the type that will release said hydrogen under certain conditions of cooling and will then take up the released hydrogen when heated; and a spirally wound ribbon of a metal wrapped around said wire and preventing direct contact between the wall of said tube and of said wire, the metal of said ribbon being one which does not fuse to the wall of said tube at high temperatures, even though in the presence of considerable amounts of hydrogen, said ribbon also providing passage means for hydrogen through said tube between said tube and said wire, when said hydrogen is released.

12. A heat-to-pressure transducer combination comprising a generally filamentary enclosure of extended length; a solid of the type that evolves large quantities of gas when cooled to a certain temperature and reversibly ingasses at elevated temperatures, said solid being disposed in said enclosure along substantially the full length thereof to make such combination responsive to external heat for varying the pressure within said enclosure by a substantial amount; passage means for distributing said pressure in said enclosure; and a diaphragm closing an area of said enclosure and deflected by the variation in pressure.

13. A temperature-sensing transducer comprising a filamentary tube containing a gas and a solid material disposed along substantially its full length that, when heated, takes in said gas in multiples of its own volume, means providing continuous passage for said gas along said full length, and a pressure switch connected to said tube.

References Cited

UNITED STATES PATENTS

| | | | |
|---|---|---|---|
| 3,041,821 | 7/1962 | Lindberg | 60—23 |
| 3,075,348 | 1/1963 | Baker | 60—23 |
| 3,122,728 | 2/1964 | Lindberg | 340—229 |
| 3,277,860 | 10/1966 | Lindberg | 73—368.1 |

FOREIGN PATENTS 11,393  3/1914  Great Britain.

OTHER REFERENCES

Gibbs, Jr.: "Hydrides," Report of the New England Association of Chemistry Teachers, pp. 577–582, October 1948.

LOUIS R. PRINCE, *Primary Examiner.*

N. B. SIEGEL, *Examiner.*